United States Patent [15] 3,666,953
Splichal, Jr. [45] May 30, 1972

[54] UP-DOWN COUNTER FOR BACKGROUND COMPENSATION

[72] Inventor: William F. Splichal, Jr., San Jose, Calif.

[73] Assignee: The United States of America as represented by the United States Atomic Energy Commission

[22] Filed: Aug. 18, 1970

[21] Appl. No.: 64,714

[52] U.S. Cl. .................................. 250/83.3 R, 250/83.6 R
[51] Int. Cl. ........................................................ G01t 1/16
[58] Field of Search ..................... 250/83.3 R, 83.6 R, 83.6 S

[56] References Cited

UNITED STATES PATENTS 2,562,968   8/1951   Teichmann et al. ................ 250/83.6 S
3,551,672  12/1970   Homer .......................... 250/83.6 R X Primary Examiner—James W. Lawrence
Assistant Examiner—Davis L. Willis
Attorney—Roland A. Anderson

[57] ABSTRACT

A radiation monitor provides a signal when contamination exceeds a minimum allowable proportion of background radiation. The monitor includes two sensors for separately measuring background and the total of background and contamination radiation. An up-down counter accumulates only background count for an initial time interval then deducts the total count for a second time interval while continuing to accumulate background count. Adjustable timer means allows the initial to second time interval ratio to be adjusted to set the minimum allowable contamination to background ratio. An alarm is activated if the contamination to background ratio exceeds the minimum allowable.

3 Claims, 2 Drawing Figures

INVENTOR.
WILLIAM F. SPLICHAL Jr.
BY
ATTORNEY:

AN UP-DOWN COUNTER FOR BACKGROUND COMPENSATION

BACKGROUND OF INVENTION

The present invention was made in the course of, or under, a contract with the United States Atomic Energy Commission.

Field of the Invention

The present invention relates to radiation detection devices and particularly to devices for monitoring radioactive contamination on a person or article. For instance, this invention can be used with a hand and foot radiation monitor for examining personnel leaving a potentially contaminated area. Similarly, other detection devices for monitoring containers or tools can likewise employ the present invention.

In these and similar applications it is desirable to provide warning when the amount of contamination on the person or article is above an acceptable level. Often these radiation measurements are made in an area having a variable background radiation level. In these situations the maximum sensitivity is achieved by setting alarm levels as a fraction or proportion of background radiation.

DESCRIPTION OF PRIOR ART

Prior art radiation detection devices which compensate for background radiation have a number of disadvantages including the use of complicated computational circuitry. These devices have not presented contamination radiation as a proportion in respect to background radiation. Moreover, analog mode components have been employed rather than components employing the more accurate digital mode.

For instance, one prior art device provides two radiation sensors for separately measuring a clean air sample and a contaminated air sample. The output of the first sensor is continuously subtracted from the other with a vacuum tube subtractor and voltmeter circuit to give a net output analagous to the count rate of the sample or the contamination. Such a device is described in "Monitor for Airborne Alpha Particles" by Knowles, NUCLEONICS, June 1955, p. 98–102.

SUMMARY OF INVENTION

Therefore, it is an object of the present invention to provide an uncomplicated radiation monitoring alarm for warning of excess contamination radiation in the presence of variable background radiation.

It is a further object to provide an accurate radiation monitoring device for signaling when the contamination to background radiation ratio exceeds a predetermined limit.

In accordance with the present invention there is provided a first radiation sensor for background count and a second radiation sensor for the total of background and contamination count. An up-down counter accumulates the background count from the first sensor for an initial time interval. Then, the counter continues to accumulate background count while deducting the total of background and contamination count as measured by the second sensor for a second time interval. A timer device permits adjustment of the initial and second time intervals to set a minimum allowable ratio of contamination to background count. An alarm or signal is activated if the total of background and contamination count from the second sensor completely offsets the accumulated background count from the first sensor to indicate an excessive contamination to background ratio.

DESCRIPTION OF THE DRAWINGS

The present invention is illustrated in the accompanying drawings wherein.

DESCRIPTION OF THE PREFERRED EMBODIMENT

Figure 1:
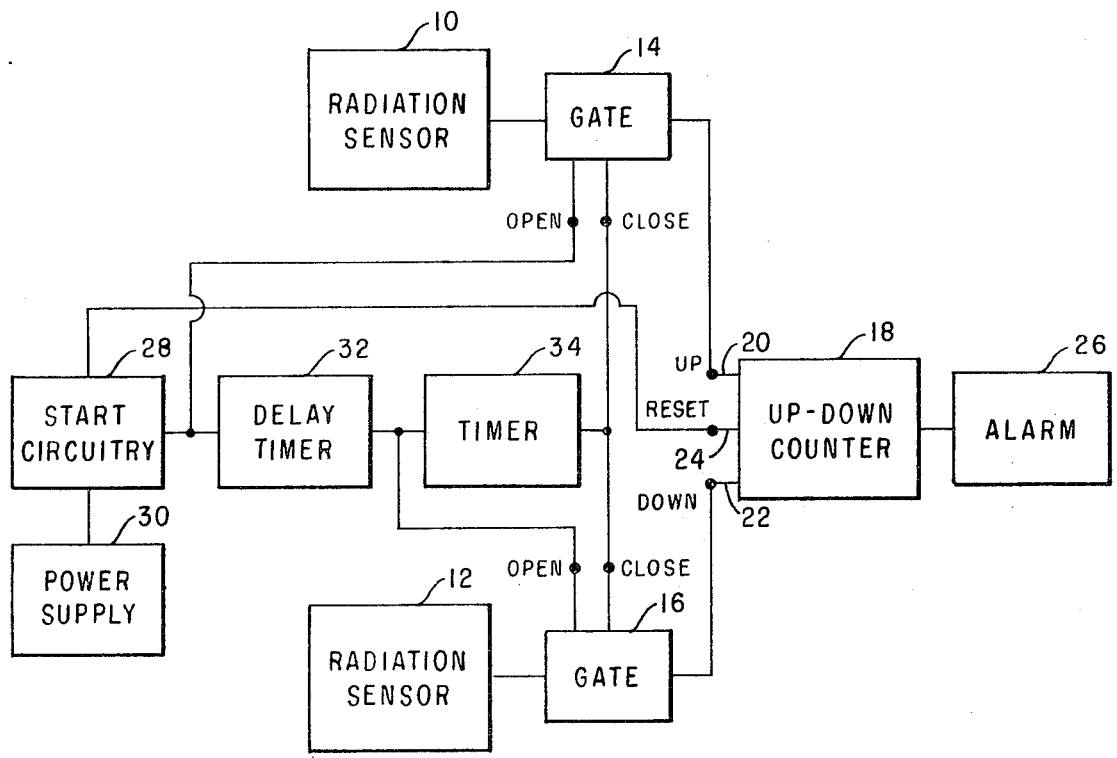
FIG. 1 is a diagrammatic representation of a radiation monitor.

Referring now to FIG. 1 of the drawings, a first radiation sensor 10 is disposed at a location to sense only background radiation while a second radiation sensor 12 is disposed within the same background radiation flux but also arranged to sense any contamination on a person or an article. The radiation sensors 10 and 12 are preferably pulse-type instruments such as G-M tubes or proportional counter type sensors to permit digital mode counting. Such instruments provide a countable pulse output representing the interactions of nuclear particles with the system.

A first relay or gate 14 connects the output of the first radiation sensor 10 to one input 20 of an up-down counter 18. A second relay or gate 16 connects the output of the second radiation sensor 12 to the other or correlative input 22 of the up-down counter 18. Gates 14 and 16 are each shown with an "open" and a "close" input for receiving electrical signals for their operation. It will be understood that both gates 14 and 16 can be ordinary logic gates or relays and may or may not have both an "open" and a "close" input. For instance consecutive or coded signals on a single input may alternately open and close the gates.

The up-down counter can be any suitable two directional digital counter. One particularly suitable and inexpensive counter is a synchronous four bit up-down counter, type SN 74192N manufactured by the Texas Instruments Company. The counter is shown with an "up" input 20 for receiving the background radiation count and a correlative "down" input 22 for receiving the background and contamination count. Count signals received into correlative input 22 will be deducted from count received and accumulated through input 20. A "reset" input 24 may also be required or a counter with automatic reset after termination of the input may be provided. An alarm or signal 26 such as a bell or light is connected to the output of the up-down counter 18 and is activated when the counter reaches a zero count level. The counter begins operation and is reset to a negligible positive count rather than zero to prevent false activation of the alarm.

Start circuitry 28 is provided to connect a power supply 30 in sequence to the "reset" input of the up-down counter 18 and then to the "open" input of gate 14. A delay timer 32 is also energized by circuitry 28 to begin an initial time interval when gate 14 is opened. Timer 32 provides an output signal after expiration of the initial time interval. The output of delay timer 32 is connected to the "open" input of gate 16 and to the input of a second timer 34 to begin a second time interval. After the second time interval, timer 34 provides an output which is transmitted to the "close" input of both gates 14 and 16. It will be clear that timers 32 and 34 can be a single unit or other variation with appropriate inputs and outputs to accomplish the required timing functions.

Figure 2:
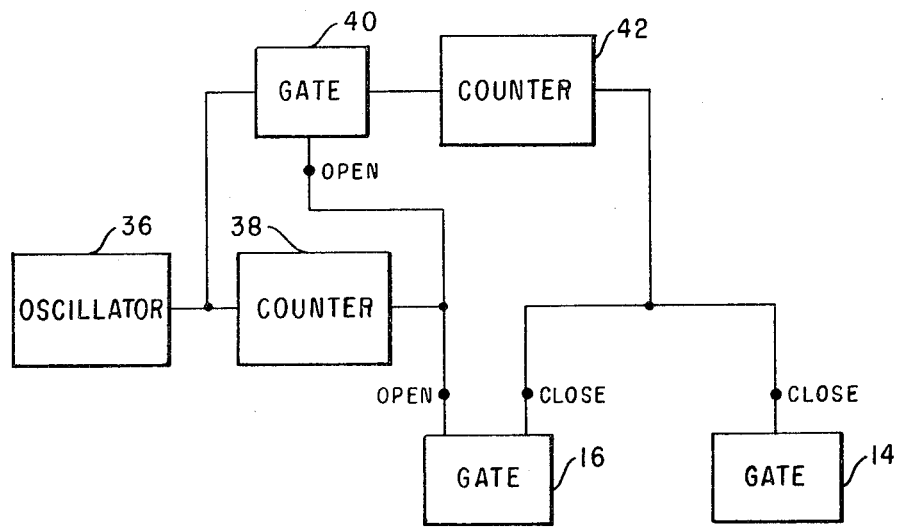
FIG. 2 is a diagrammatic representation of a timer device employable in the radiation monitor of FIG. 1.

One particularly suitable and accurate timer unit is shown in FIG. 2. A pulse generator or oscillator 36 transmits a constant rate signal to a digital counter 38. Counter 38 is set to produce an output after it accumulates sufficient count to define the initial time interval. The output of counter 38 is employed to open gate 40 and gate 16. Gate 40 then passes the pulse signal generated in oscillater 36 to a second digital counter 42. Counter 42 is set to transmit an output signal to the "close" input of gates 14 and 16 after the second time interval has expired. Gates 14 and 16 as shown in FIG. 1 control transmission of the outputs from radiation sensors 10 and 12 to the up-down counter 18.

In employing the present invention, the background radiation count detected by radiation sensor 10 is accumulated in up-down counter 18 for the initial and for the second time interval. The background and contamination count detected by radiation sensor 12 is accumulated only for the second time interval. This background and contamination count is continuously deducted during the second time interval from the total background count made during both time intervals. If the overall net count becomes zero before the end of the second time interval then an alarm is activated to warn of excess contamination.

Let:

$t_1$ represent the initial time interval set by delay timer 32

$t_2$ represent the second time interval set by timer 34

$BG_1$ represent average background radiation count rate over $t_1$ $BG_2$ represent average background radiation count rate over $t_2$ C represent average contamination radiation count rate over $t_2$ if alarm 26 is activated then:

$$t_2(BG_2+C) \geq t_1(BG_1)+t_2(BG_2)$$

and:

$$C/BG_1 \geq t_1/t_2$$

If the time intervals, $t_1$ and $t_2$, are made of small duration then the change in background count rate can be presumed to be of no significance from one time interval to the next, that is $BG_1$ will be substantially equal to $BG_2$. Thus if the ratio of the initial time interval to the second time interval is selected as the minimum allowable ratio of contamination to background radiation the alarm 26 will operate as a warning of excessive contamination.

To operate the radiation monitor shown in the drawing, start circuitry 28 is activated to reset up-down counter 18. This may be done for instance by a person engaging a hand and foot radiation monitor. Gate 14 is then opened to transmit the output of radiation sensor 10 to the "up" input of the up-down counter 18. The counter 18 thereby begins to accumulate the background radiation count. Delay timer 32 allows an initial time interval to pass while only background radiation is registered before opening gate 16 to connect radiation sensor 12 to the "down" input of up-down counter 18. Counter 18 then begins deducting the background and contamination count received from radiation sensor 12 while still accumulating background count received from radiation sensor 10. Timer 34 allows a second time interval to pass before closing both gates 14 and 16. Timer 32 and 34 are previously set such that the initial to the second time interval ratio is equal to the minimum allowable ratio of contamination to background count. For example, the initial time interval could be about 1 second while the second time interval could be about 4 seconds to establish a 0.25 minimum allowable contamination to background ratio. If the actual contamination to background ratio is in excess of the minimum allowable then counter 18 will be returned to zero and alarm 26 will be activated.

This invention provides an uncomplicated but accurate radiation monitoring device to give warning when contamination exceeds a minimum allowable fraction of background in a variable background environment. The computation is accomplished with a minimum of electrical components to render the device especially useful in field applications where dependability and infrequent maintenance are required.

What is claimed is:

1. Radiation monitoring device for determining contamination radiation as a proportion in respect to background radiation comprising:
   a. a first radiation sensor for measuring background radiation;
   b. a second radiation sensor for measuring the total background radia-tion and contamination radiation;
   c. two-directional counter means having an "up" and a "-down" input individually connected to the outputs of said first and said second radiation sensors;
   d. timer means including electrical gates disposed in the connection between each output of said radiation sensors and each input of said counter means for permitting said counter means to accumulate the count of said first sensor during a first and a second time interval and for permitting said counter means to deduct the count of said second sensor during said second time interval; and
   e. means associated with said counter for signaling sufficient count by the second sensor to deplete the count accumulated from said first sensor.

2. The radiation monitoring device of claim 1 wherein said radiation sensors are pulse-type instruments and said counter means being adapted to accumulate said "up" input and deduct said "down" input in a digital mode.

3. The radiation monitor of claim 1 wherein said timer means includes an oscillator for producing a constant rate pulse signal and a first and a second digital counter for receiving said constant rate pulse signal, said first digital counter being set to define said initial time interval and said second digital counter being set to define said second time interval.

* * * * *